United States Patent [19]

Sullerot et al.

[11] Patent Number: 5,216,486
[45] Date of Patent: Jun. 1, 1993

[54] APPARATUS FOR DETECTING IRREGULARITIES IN THE DIAMETER OF A FILAMENT

[75] Inventors: David Sullerot; Michel Faure, both of Paris; Bernard Floch, Chaumont en Vexin; Yves Lumineau, Eragny S/Oise, all of France

[73] Assignee: Alcatel Fibres Optiques, Bezons Cedex, France

[21] Appl. No.: 810,872

[22] Filed: Dec. 20, 1991

[30] Foreign Application Priority Data

Dec. 21, 1990 [FR] France ................. 90 16112

[51] Int. Cl.$^5$ ............................................. G01B 11/10
[52] U.S. Cl. ..................................... 356/385; 356/73.1
[58] Field of Search ............ 356/73.1, 238, 384–387, 356/237; 250/560, 562, 572

[56] References Cited

U.S. PATENT DOCUMENTS 2,641,960 6/1953 Strother ......................... 356/385

FOREIGN PATENT DOCUMENTS 0294889 12/1988 European Pat. Off. .
1075323 2/1960 Fed. Rep. of Germany .
1931555 2/1970 Fed. Rep. of Germany ...... 250/560
2383138 10/1978 France .
2075670 11/1981 United Kingdom ................ 356/386

Primary Examiner—F. L. Evans
Attorney, Agent, or Firm—Sughrue, Mion, Zinn, Macpeak & Seas

[57] ABSTRACT

Apparatus for detecting irregularities in the diameter of a filament has a small light source placed at the focus of an objective lens system. A horizontal slot constitutes a diaphragm for the objective lens system. A first optical system forms an image of the slot in a plane in which the filament runs past. Detectors detect the beam intercepted by the filament. An optical splitting system (P1) is interposed in the path of the beam (A), downstream of the slot (3) and upstream of the filament (5). The system is designed to form two sharp images (3', 3") of the slot (3) in a plane (4). The detectors are two oppositely-connected detectors (D1, D2) each receiving a respective beam (C, C') intercepted by the filament (5).

15 Claims, 3 Drawing Sheets

APPARATUS FOR DETECTING IRREGULARITIES IN THE DIAMETER OF A FILAMENT

The present invention relates to apparatus for detecting irregularities in the diameter of filaments, and in particular of sheathed optical fibers.

For example, during manufacture of sheathed optical fibers, the fiber-drawing operation is followed by an operation of coating the resulting fiber, so as to give it a protective sheath. A sheathed optical fiber is thus obtained, which sheathed optical fiber is referred to below simply as an "optical fiber". During the coating step, it is necessary to monitor the coating diameter very accurately, because any variation therein leads to variation in the diameter of the optical fiber being manufactured, which variation may exceed the accuracy tolerance limits. There is a risk that any fault that is not detectable during production will subsequently impede the passage of the fibers through guides.

For such monitoring, a commercially-available optical system is used which has a narrow passband (about 10 Hz to 500 Hz), i.e. it is not possible to detect a coating fault 0.5 mm long and a few microns thick at a conventional fiber-drawing speed lying in the range 200 m/min to 500 m/min. In the field of optical fibers, the tolerance as regards the thickness of coating faults is ±15 μm (which corresponds to a passband of 7 kHz). That system therefore cannot be used to detect variations in optical fiber coating diameter.

Therefore, in order to achieve passbands of 7 kHz, apparatus using the principle of ombroscopy is used, which apparatus theoretically enables coating faults to be detected for fiber-drawing speeds of up to 600 m/min and above (passbands wider than 20 kHz).

German Patent DE 3,803,353 describes an irregularity detector using the conventional ombroscopy principle: the image of a source is formed in a plane in which, for example, a fiber to be monitored passes (the fiber is vertical and orthogonal to the optical axis of that apparatus). The resulting image is taken up at a detector. The signal obtained after processing at the output of the detector is proportional to the quantity of light received by the detector. It is compared with a reference signal corresponding to a fiber free of coating faults.

In practice, the problem which arises is that of the uniformity of the source. If the illumination is not uniform, it may lead to variations in the signal at the detector relative to the reference signal when the fiber is displaced in the image of the source, which variations may either show up faults that do not exist, or else conceal the existence of faults that coincide with the distortions due to the fact that the source is not uniform.

An object of the present invention is to devise apparatus for detecting irregularities in the diameters of filaments, for which apparatus the uniformity of the light received is not a critical parameter, the apparatus therefore enabling (e.g. for optical fibers) coating faults to be detected, the dimensions of which faults comply with the tolerance limits of ±15 μm for thickness, and ±0.5 mm for length.

The present invention provides apparatus for detecting irregularities in the diameter of a filament, said apparatus comprising a small light source placed at the focus of an objective lens system centered on an optical axis that is orthogonal to said filament, a slot which is orthogonal in direction both to said optical axis and to said filament and which constitutes a diaphragm for said objective lens system, a first optical system centered on said optical axis so as to form an image of said slot in a plane orthogonal to said optical axis, in which plane said filament runs past, and detection means for detecting the beam intercepted by said filament, said apparatus being characterized in that:

an optical splitting system is interposed in the path of said beam, after said slot and before said filament, which system is designed to form two sharp images of said slot in said plane; and said detection means comprise two detectors, with each detector receiving a beam intercepted by said filament, each detector supplying an intermediate signal, and the two detectors being oppositely connected so as to supply a final signal which is a function of the difference between the two intermediate signals.

According to an important characteristic, the detectors are situated on two respective separate sharp images of said source.

According to other characteristics of the apparatus, the light source may be chosen to be monochromatic. For example, a light-emitting diode whose spectrum width is less than 100 nm may be used.

In order to improve the signal-to-noise ratio, it is possible for said source to be amplitude modulated at a frequency higher than the maximum frequency of the signal to be detected.

The optical splitting system is chosen such that it splits the whole of the incident beam without causing a path-length difference between the two resulting beams. For example, a Wollaston prism or a Rochon prism may be chosen.

In the event that an optical splitting system acting by splitting polarizations of the beam emitted by the source (Wollaston prism or Rochon prism) is used, a polarizer may be disposed in the path of the light beam between the source and the optical splitting system, and its axis of polarization may be angularly positioned so as to enable the light intensities of the two images of said source to be balanced.

Furthermore, the height of the sharp images of the slot is equal to the minimum length of a fault to be detected. The length of the sharp images of said slot is greater than twice the amplitude of the lateral displacement of said filament in the plane orthogonal to the optical axis. A length of 2 mm is acceptable. The value of the gap between the two sharp images of the slot advantageously lies in the range once to ten times the value of the height of the images.

Furthermore, the detectors may be placed on two respective separate sharp images of said slot.

In order to separate the two sharp images of said source, a deflecting prism may be disposed before said detectors, which prism prevents the two images of the source from overlapping, and enables the images to be respectively directed to the corresponding detectors.

Lastly, the slot may be placed at the image focus of the objective lens system so as to improve the uniformity of the illumination.

Characteristics and advantages of the present invention appear from the following description of a preferred embodiment of the apparatus of the invention given by way of non-limiting example.

Figure 1:
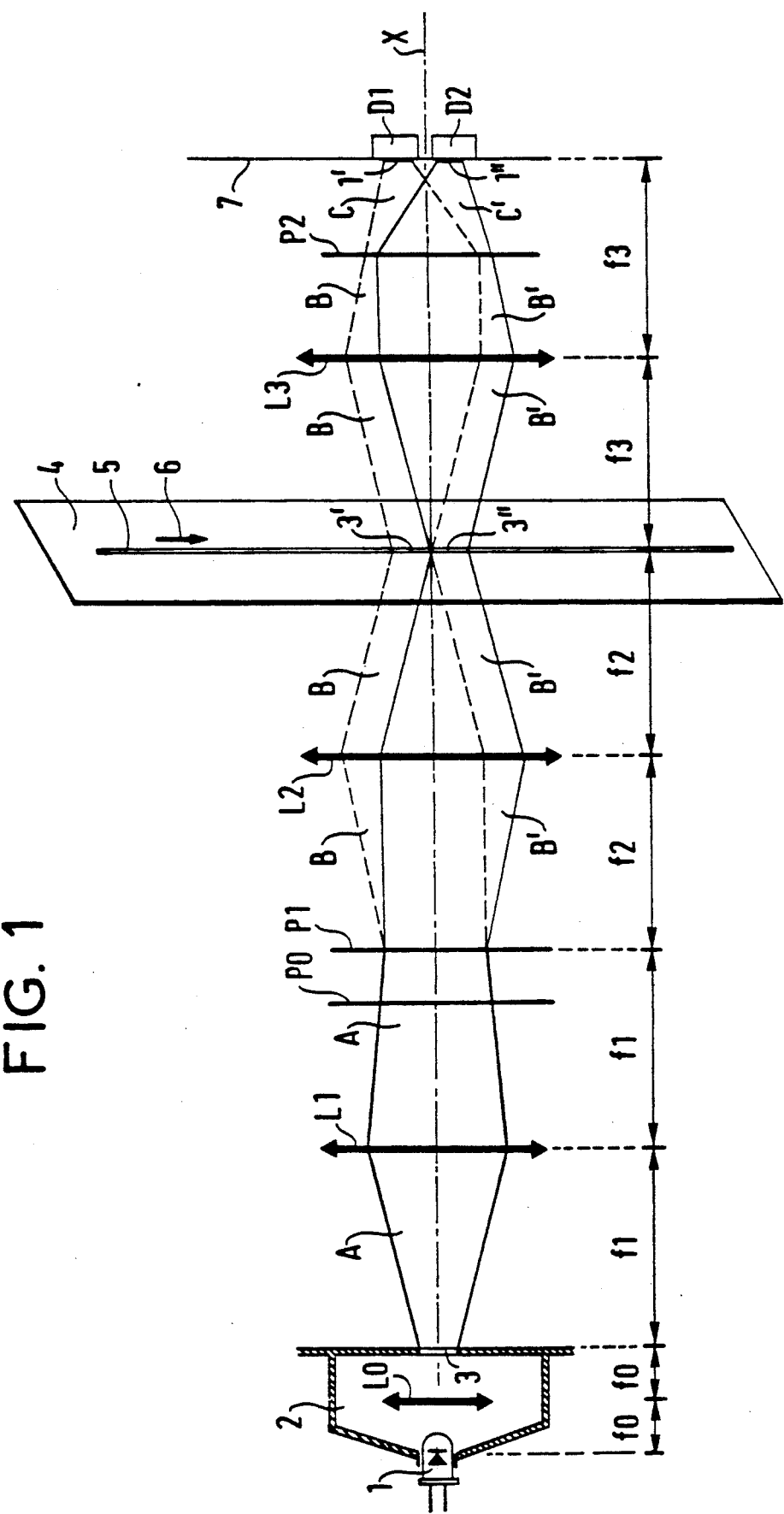
FIG. 1 is a diagram showing apparatus of the invention and the path of a light beam coming from the source.

In FIG. 1, a small light source 1 is placed at the object focus of an objective lens system 2 diagrammatically represented by a lens Lo centered on an optical axis X; a horizontal slot 3, orthogonal to the axis X, is placed at the image focus of the objective lens system 2. Preferably, a monochromatic source 1 is chosen, so as to obtain sharp images that are free from chromatic aberration. For example, a light-emitting diode (LED) may be chosen having a spectrum width of less than 100 nm.

Illumination does not need to be uniform. However, the position of the slot 3 at the image focus of the objective lens system 2 is such that the illumination at the slot is made more uniform (far field) than the illumination at the source (near field).

A light beam A coming from the source 1 via the slot 3 reaches a lens L1 of focal length f1, the object focus of the lens being situated on the axis X at the slot 3, and a Wollaston prism P1 being placed at the image focus of the lens, which prism enables the incident beam A to be split, by separating polarizations, into two beams B (shown by dashed lines) and B' (shown by solid lines) of mutually orthogonal polarizations. Two sharp images 3' and 3" of the slot 3 are then formed in a plane 4 by means of a lens L2 of focal length f2 whose object focus coincides with the image focus of L1 at P1. Said images are mutually parallel and horizontal.

The fiber to be monitored 5 runs past in the plane 4 vertically and perpendicular to the optical axis X and to the two images 3' and 3", in the direction of the arrow 6. It does not matter if the fiber 5 is not exactly in the plane 4, so long as it runs past in a plane very close thereto and parallel to the plane 4, because the images 3' and 3" of the slot 3 are sharp over a considerable range.

The height h of the images 3' and 3" of the slot 3 is chosen so as to match the minimum length of the faults to be detected. For example, h may be chosen to be substantially equal to 0.3 mm.

The length L of the images 3' and 3" of the slot 3 must be compatible with any lateral displacement of the fiber to be monitored. For example, L may be chosen to be equal to 2 mm.

By means of a Wollaston prism P2 and a lens L3 of focal length f3, whose object focus coincides with the image focus of the lens L2 on the axis X in the plane 4, two separate sharp images 1' and 1" of the source 1 are then formed on two respective oppositely-connected detectors D1 and D2 in a plane 7 placed at the image focus of L3. In this way, after passing through the lens L3, the beams B and B, are deflected by the prism P2, and the resulting beams C (shown by dashed lines) and C' (shown by solid lines) are received by the two respective detectors D1 and D2. After processing the signals output by the detectors, two voltages V1 and V2 are obtained. The voltages are proportional to the quantity of light received by each detector. Since the detectors D1 and D2 are oppositely connected, the final signal is a function of the difference V1−V2 (or V2−V1). As soon as there is a coating fault, the final signal is no longer zero, and the fault is immediately detected.

The results obtained by means of the apparatus of the invention are not critical with respect to the uniformity of the light received; this parameter is eliminated because the final signal corresponds to the difference between the two signals obtained. In the same way, the results are not critical with respect to the positions of the images of the source on the surfaces of the detectors, even if the responses of the detectors depend on said positions. Since the images formed on the detectors are images of the source, they remain invariant even if the fiber is displaced in the measuring region.

In this way, the apparatus of the invention enables coating faults to be detected in compliance with the tolerance limits for an optical fiber, which limits are ±15 μm for thickness and ±0.5 mm for length.

Figure 2:
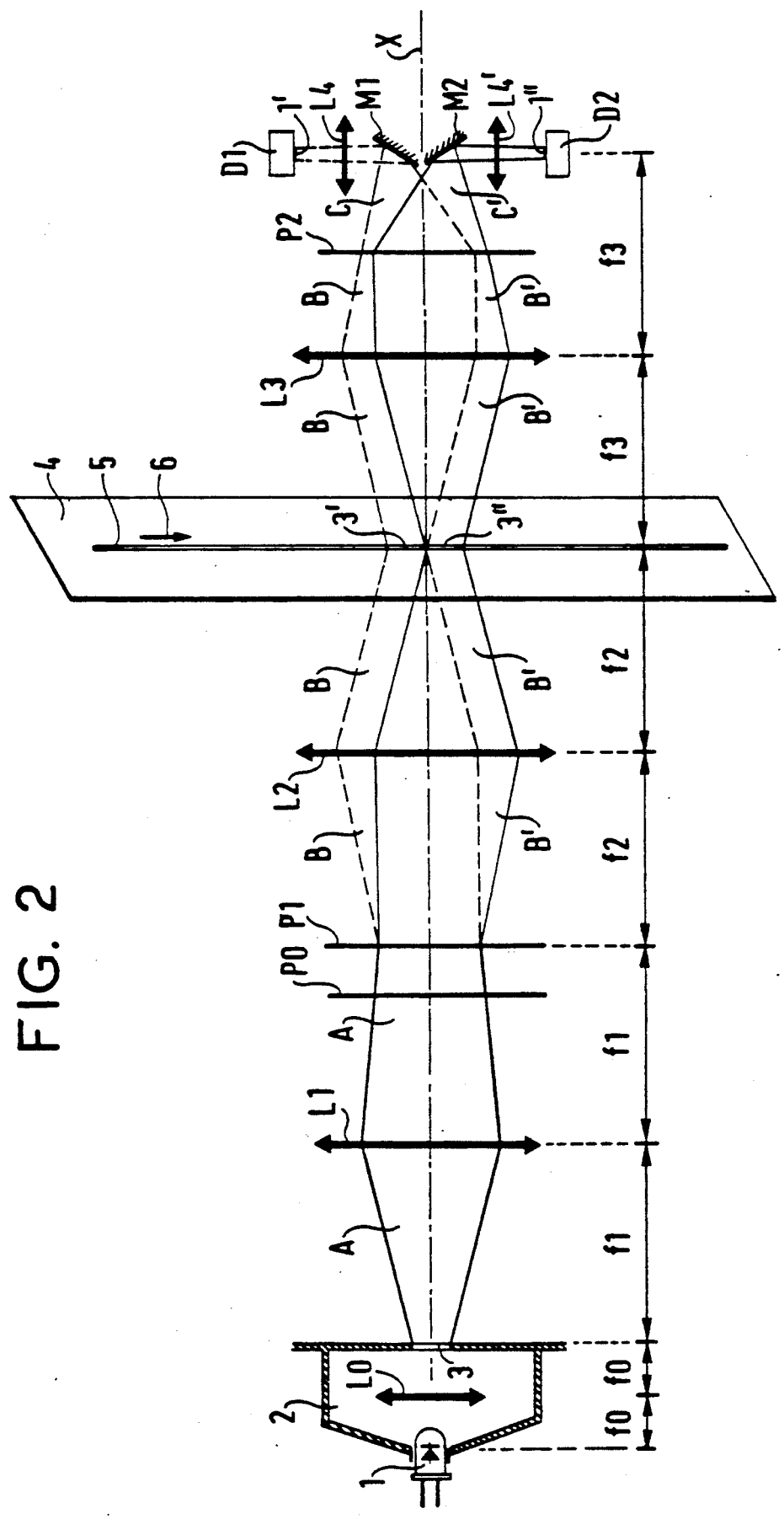
FIG. 2 shows another apparatus of the invention.

In a variant embodiment shown in FIG. 2, two mirrors M1 and M2 each receiving a respective one of the light beams C and C' are disposed after the lens L3 and in the path of the light beams C and C'. The beams C and C' are then reflected onto the respective detectors D1 and D2 via respective ones of two identical lenses L4 and L4'. The images of the source 1 and 1' are still formed on the oppositely-connected detectors D1 and D2 as in the apparatus described with reference to FIG. 1. The apparatus in this variant gives identical results and accuracies to those obtained with the apparatus described with reference to FIG. 1.

Figure 3:
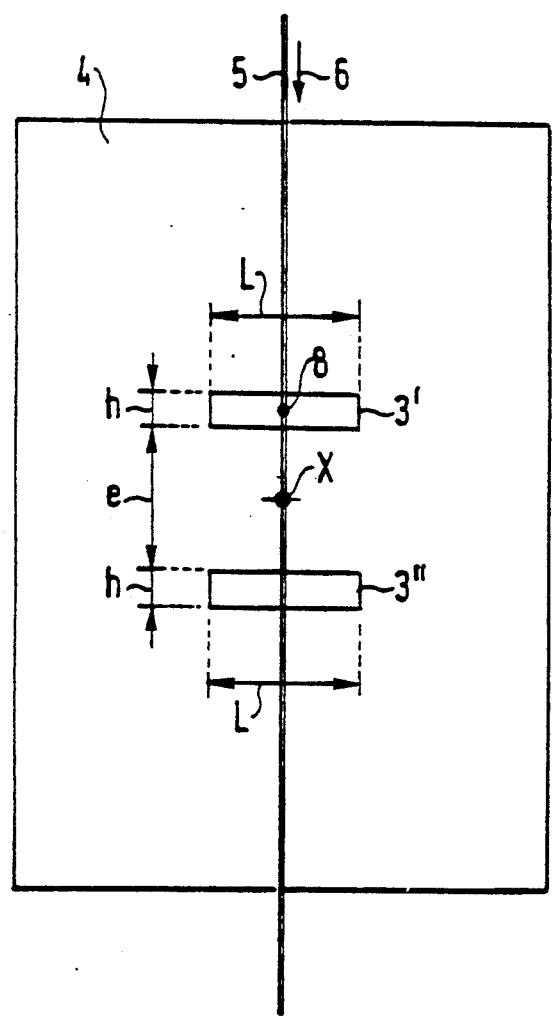
FIG. 3 is a view on the plane of a fiber to be monitored.

In an improved embodiment shown in FIG. 3, the gap e between the images 3' and 3" that is determined by the prism P1 and the focal length f2 of the lens L2 is preferably chosen to lie in the range h to 10h. Such a gap enables the apparatus to be insensitive to any periodic faults whose spatial period is equal to the gap between the images 3' and 3". A coating fault 8 is also shown in FIG. 3.

Naturally, the invention is not limited to the above-described preferred embodiment.

Any small light source may be used within the scope of the method of the invention.

Furthermore, when a polarization-separating splitting system is used, a polarizer PO whose axis of polarization is angularly positioned so as to enable the light intensities of the two images of the source to be balanced may be disposed between the source and the optical splitting system.

The intensity of the light emitted may also be modulated in order to improve the signal-to-noise ratio, with noise being constituted mainly by the daylight or the artificial light in the room in which the monitoring is being performed.

In the case of such modulation, the intensity of the source is modulated at a very much higher frequency than the maximum frequency of the signal to be detected. For example, a modulation frequency of 200 kHz is taken for a signal frequency of 20 kHz.

However, almost all noise may be avoided by installing the apparatus of the invention inside a black box.

Furthermore, instead of the Wollaston prism P1, any other image-splitting system is suitable so long as it splits the entire incident beam without causing a path-length difference between the two beams formed. For example, a Rochon prism may be used. A semi-transparent mirror may also be used, but the optical paths must be made to be identical so that the source 1 can be correctly conjugated with the detectors D1 and D2.

In a variant which is not shown, the detectors may be placed just behind the fiber at the plane 4, on the sharp images of the slot.

Naturally, the method of the invention may be applied to all sorts of filaments, without going beyond the scope of the invention. For example, irregularities in diameter may be detected in nylon threads, in plastic coverings extruded around copper wires, and generally in all filaments used in cable-making.

We claim:

1. Apparatus for detecting irregularities in the diameter of a filament, said apparatus comprising a small light source placed at the focus of an objective lens system centered on an optical axis that is orthogonal to said filament, a slot which is orthogonal in direction both to said optical axis and to said filament and which constitutes a diaphragm for said objective lens system, a first optical system centered on said optical axis so as to form an image of said slot in a plane orthogonal to said optical axis, in which plane said filament runs past, and detection means for detecting the beam intercepted by said filament, said apparatus being characterized in that:

an optical splitting system is interposed in the path of said beam, after said slot and before said filament, which system is designed to form two sharp images of said slot in said plane; and said detection means comprise two detectors, with each detector receiving a beam intercepted by said filament, each detector supplying an intermediate signal, and the two detectors being oppositely connected so as to supply a final signal which is a function of the difference between the two intermediate signals.

2. Apparatus according to claim 1, characterized in that said detectors are situated on two respective separate sharp images of said source.

3. Apparatus according to claim 1, characterized in that said source is chosen to be monochromatic.

4. Apparatus according to claim 1, characterized in that said source is a light-emitting diode whose spectrum width is less than 100 nm.

5. Apparatus according to claim 1, characterized in that said intermediate signals have a frequency which is below a maximum frequency, and that said source is amplitude modulated at a frequency higher than said maximum frequency.

6. Apparatus according to claim 1, characterized in that said optical splitting system splits the whole of said incident beam without causing a path-length difference between the two resulting beams.

7. Apparatus according to claim 1, characterized in that said optical splitting system is chosen from a Wollaston prism and a Rochon prism, both of which split an incident beam by separating polarizations.

8. Apparatus according to claim 1, characterized in that, with said optical splitting system acting by splitting polarizations of the beam emitted by the source, a polarizer is disposed in the path of the beam between the source and the optical splitting system, and its axis of polarization is angularly positioned so as to enable the light intensities of said two images of said source to be balanced.

9. Apparatus according to claim 1, characterized in that the height of the sharp images of said slot is equal to the minimum length of a fault to be detected.

10. Apparatus according to claim 1, characterized in that the length of the sharp images of said slot is chosen to be greater than twice the amplitude of the lateral displacement of said filament in the plane orthogonal to the optical axis.

11. Apparatus according to claim 1, characterized in that said slots are separated one from the other by a gap and that the value of said gap between the two sharp images of said slot lies in the range of one to ten times the value of said height of said sharp images of said slot.

12. Apparatus according to claim 1, characterized in that the length of said slot is equal to 2 mm.

13. Apparatus according to claim 1, characterized in that said detectors are situated on two respective separate sharp images of said slot.

14. Apparatus according to claim 1, characterized in that, in order to separate said sharp images of said source, a deflecting prism is disposed before said detectors, which prism prevents said images of said source from overlapping, and enables said images of said source to be respectively directed to the corresponding detectors.

15. Apparatus according to claim 1, characterized in that said slot is placed at the image focus of said objective lens system.

* * * * *